US011868347B1

(12) United States Patent
Papakonstantinou et al.

(10) Patent No.: US 11,868,347 B1
(45) Date of Patent: Jan. 9, 2024

(54) REWRITING QUERIES TO COMPENSATE FOR STALE MATERIALIZED VIEWS

(71) Applicant: Amazon Technologies, Inc., Seattle, WA (US)

(72) Inventors: Yannis Papakonstantinou, La Jolla, CA (US); Balakrishnan Narayanaswamy, San Jose, CA (US); Christos Faloutsos, Pittsburgh, PA (US); Vuk Ercegovac, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 16/698,843

(22) Filed: Nov. 27, 2019

(51) Int. Cl.
*G06F 16/2453* (2019.01)
*G06F 16/2455* (2019.01)
*G06F 16/16* (2019.01)
*G06F 16/23* (2019.01)
*G06F 16/22* (2019.01)

(52) U.S. Cl.
CPC ...... *G06F 16/24534* (2019.01); *G06F 16/162* (2019.01); *G06F 16/2282* (2019.01); *G06F 16/2393* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 6,334,128 | B1 * | 12/2001 | Norcott | G06F 16/2393 |
| 7,440,963 | B1 * | 10/2008 | Bello | G06F 16/24539 |
| 8,103,689 | B2 | 1/2012 | Gupta et al. | |
| 9,659,039 | B2 | 5/2017 | Ziauddin et al. | |
| 10,031,944 | B1 * | 7/2018 | Waas | G06F 16/3332 |
| 2004/0225666 | A1 * | 11/2004 | Hinshaw | G06F 16/2393 |
| 2006/0122964 | A1 * | 6/2006 | Yu | G06F 16/2393 |
| 2008/0270489 | A1 * | 10/2008 | Kharatishvili | G06F 16/2379 707/999.203 |
| 2009/0018991 | A1 * | 1/2009 | Thiyagarajan | G06F 16/24534 |
| 2011/0137875 | A1 * | 6/2011 | Ziauddin | G06F 16/2393 707/693 |
| 2014/0280028 | A1 * | 9/2014 | Ding | G06F 16/2393 707/717 |
| 2014/0280029 | A1 * | 9/2014 | Ding | G06F 16/24539 707/717 |
| 2015/0088812 | A1 * | 3/2015 | Ziauddin | G06F 16/21 707/609 |
| 2015/0088856 | A1 * | 3/2015 | Hunter | G06F 16/24544 707/714 |

* cited by examiner

*Primary Examiner* — Christopher J Raab
(74) *Attorney, Agent, or Firm* — S. Scott Foster; Kowert, Hood, Munyon, Rankin & Goetzel, P.C.

(57) ABSTRACT

Queries that reference materialized views may be rewritten to compensate for stale materialized views. A query may be received that references a materialized view. A determination may be made as to whether the materialized view is stale. For a stale materialized view, the query may be rewritten to generate a query plan that obtains changes made to base tables for the materialized view not included in the stale materialized view and considers the change(s) when generating a result for the query from the materialized view. The rewritten query may then be performed to provide a result as if the materialized view were up-to-date.

20 Claims, 12 Drawing Sheets

*simulated provenance merge 1110*

```
CREATE PROCEDURE some_Simulated_ProvMerge(..., CURRENT_XID INTEGER)
LANGUAGE SQL AS $$

CREATE TEMPORARY TABLE delta_full_MV
 DISTKEY( provenance attributes of delta full of MV )
 SORTKEY( provenance attributes of delta full of MV )
AS <delta full query of MV>;

INSERT INTO <internal MV>
  (SELECT delta_full_MV.<provenance attr1>, ...,
          delta_full_MV.<provenance attrN>,
   CASE WHEN
   <internal MV>.num_rec IS NULL
   THEN delta_full_MV.<measureAttr1>
   ELSE <expr1>
   END AS <measureAttr1>,
   ...,
   CASE ... END AS <measureAttrN>,
   delta_full_MV.num_rec + NVL(<internal MV>.num_rec, 0) AS num_rec
   FROM delta_full_MV LEFT OUTER JOIN <internal MV> ON
   (<internal MV>.<provenance attr1> = delta_full_MV.<provenance attr1>
    AND ...
    AND <internal MV>.<provenance attrN> =
        delta_full_MV.<provenance attrN>
   )

   WHERE delta_full_MV.num_rec + NVL(<internal MV>.num_rec) > 0
   );

DELETE FROM <internal MV>
 USING delta_full_MV
 WHERE
 ( <internal MV>.<provenance attr1> = delta_full_MV.<provenance attr1>
 AND ...
 AND <internal MV>.<provenance attrN> = delta_full_MV.<provenance attrN>
 )
 AND insertxid < CURRENT_XID
 AND NOT deletexid = NOT_DELETED_XID;
$$;
```

REWRITING QUERIES TO COMPENSATE FOR STALE MATERIALIZED VIEWS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Many types of data access requests require intensive computational and storage access workloads. As data stores may have to process high workload access requests, techniques that reduce computational load, such as techniques that provide materialized views, may be implemented. Maintaining materialized views, however, is not without cost. Techniques that improve system performance by allow for maintenance of materialized views to be delayed until advantageous time offer further performance improvements and are highly desirable.

BRIEF DESCRIPTION OF THE DRAWINGS

FIG. 11 is a high-level flowchart illustrating methods and techniques to implement a simulated provenance merge operation, according to some embodiments.

Figure 1:
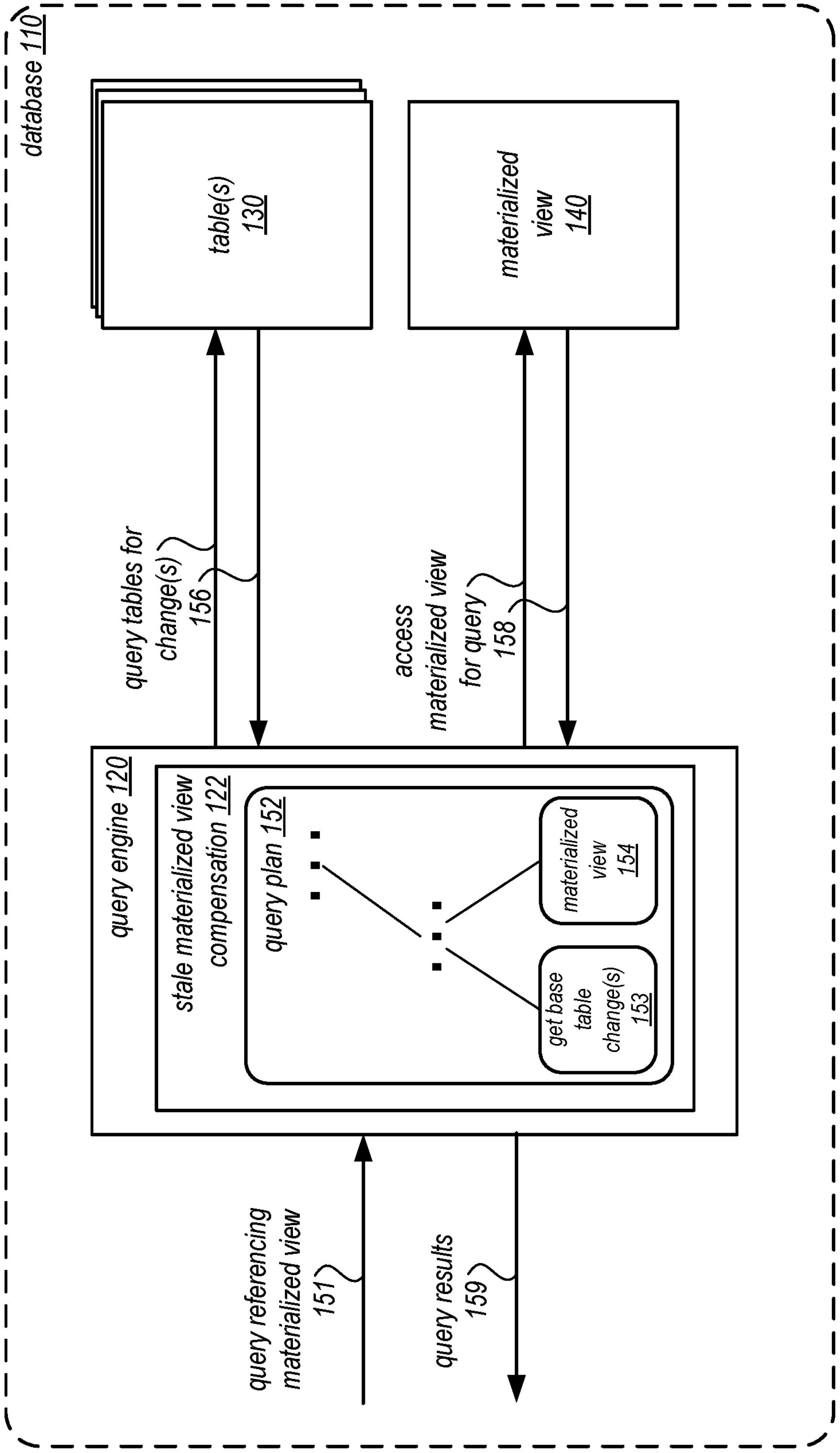
FIG. 1 is a logical block diagram illustrating rewriting queries to compensate for stale materialized views, according to some embodiments

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for rewriting queries to compensate for stale materialized views are described herein. Materialized views may be created for databases to offer a performance benefit to client applications because the results of a query stored as a materialized view may not have to be performed again in order to obtain information already found in the materialized view, in various embodiments. For example, instead of submitting the same query to database, the query may be submitted once to create the materialized view to obtain information. Then when the information is desired again, a query may be directed to the materialized view which already stores the information, saving computing resources to find, evaluate, combine, and/or otherwise process database data into a result for the query (or a query that is based on or could use the result of the query that is used to create the materialized view).

Materialized views, however, can become stale or out of sync with recent updates to a database. For example, updates to a database may add additional data, modify existing data, delete or remove data, alter data schemas for data, among other updates. In order to continue to offer useful information, a materialized view may be updated to be consistent with updates made to the database.

Keeping a materialized view up to date, however, is not without maintenance costs. Updates to a database may or may not affect the materialized view. The difference, therefore, between the database as updated and the version of the database used to create the materialized view may be identified and evaluated to determine what updates, if any, should be performed. Gathering the information to make materialized view updates may be similar to the performance of a query. Therefore, optimizations that can reduce the work for maintenance operations to update a materialized view, can reduce the impact that maintenance costs may have on other work (e.g., other client requests or background operations) being performed at the database, improving the performance of the database overall.

In addition to optimizing the work of maintenance operations to update a materialized view, the timing for performance for maintenance to operations can be optimized. If, for instance, a database is experiencing a heavy workload of queries and other operations (e.g., inserts, deletes, updates, etc.), maintenance operations to update a materialized view may add additionally latency and thus the performance of maintenance operations in this scenario may be desirable to be avoided. However, in order to optimize the utilization of a materialized view, maintenance may need to be performed frequently to prevent stale materialized views from being referenced in queries, which may then have to trigger an update of the materialized view in order to proceed. The tension between these competing priorities may make optimal scheduling of maintenance operations for materialized views difficult to achieve.

In various embodiments, techniques for rewriting queries to compensate for stale materialized views may allow for optimized scheduling of maintenance views while providing more optimized techniques for providing up-to-date results from a stale materialized view, which would be consistent with the results returned by a query only referencing base tables in the database and not the materialized view (or consistent with an up-to-date materialized view). For instance, a scheduling technique for maintenance operations may be able to delay maintenance until more advantageous scenarios occur, such as times of low query or other client application workloads, without sacrificing the ability of the database to provide efficient and up-to-date results when a query references a stale materialized view.

FIG. 1 is a logical block diagram illustrating rewriting queries to compensate for stale materialized views, according to some embodiments. Database 110 may be a database or other data store that provides management, maintenance, and/or access to data or information. For example, database 110 may be a relational database that provides online transactional processing (OLTP), such as may be found in databases supporting transaction heavy workloads, or online analytical processing (OLAP), such as may be data warehouse style databases that support heavy analytical workloads.

The data or information for database 110 may be organized into collections, groups, or sets of related information, such as tables 130. For example, table(s) 130 may be organized according to a table schema that specifies the number and data types (e.g., character, string, integer, floating point, etc.), column names, and/or other table information. Entries of table(s) 130 may be individual items or rows that include values for different columns (including null values in some embodiments). Client applications of database 110 may submit queries or other requests to retrieve, manipulate, process and/or otherwise return information from table(s) 130, such as query 151.

In some circumstances, as discussed above, a materialized view 140 may be created to provide a query result that may be queried as if it were another part of database 110, such as another table. A client application may send a request to create a materialized view to database 110. The request may include a query (e.g., specified according to a query language, such as structured query language (SQL) or other materialized view definition, in some embodiments. Different techniques for creating materialized views may be performed. In some embodiments, materialized view 140 may be created by storing the results of a query or other materialized view definition as a table or other persistent data structure. In other embodiments, to provide the materialized view 140, one or more internal table(s) may be created, as discussed in detail below with regard to FIGS. 4, 5A, 5B, and 6. Internal table(s) may store results of a query or materialized view definition in order to provide for efficient incremental update using stored procedure(s). For example, as discussed below with regard to FIG. 5B, multiple internal tables may be created to provide a single materialized view. Creation of internal table(s) may include obtaining and inserting into internal table(s) the data identified according to the query or other materialized view definition. When the materialized view is identified for update, the stored procedure(s) may be executed in order to apply the changes to the internal tables, which can then be used to provide materialized view 140 when queried.

In various embodiments, database 110 may implement query engine 120 to perform queries and other access requests directed to database 110. For example, query engine 120 may be implemented as part of a database management system on a single server or other standalone database system, that stores data on locally attached storage devices (e.g., persistent, block-based storage devices connected to the server via an interconnect or other non-network communication channel). Alternatively, query engine 120 may be implemented across one or multiple nodes of a group or cluster that provide access to database 110, such as processing clusters like processing cluster 300 in FIG. 3.

Figure 8:
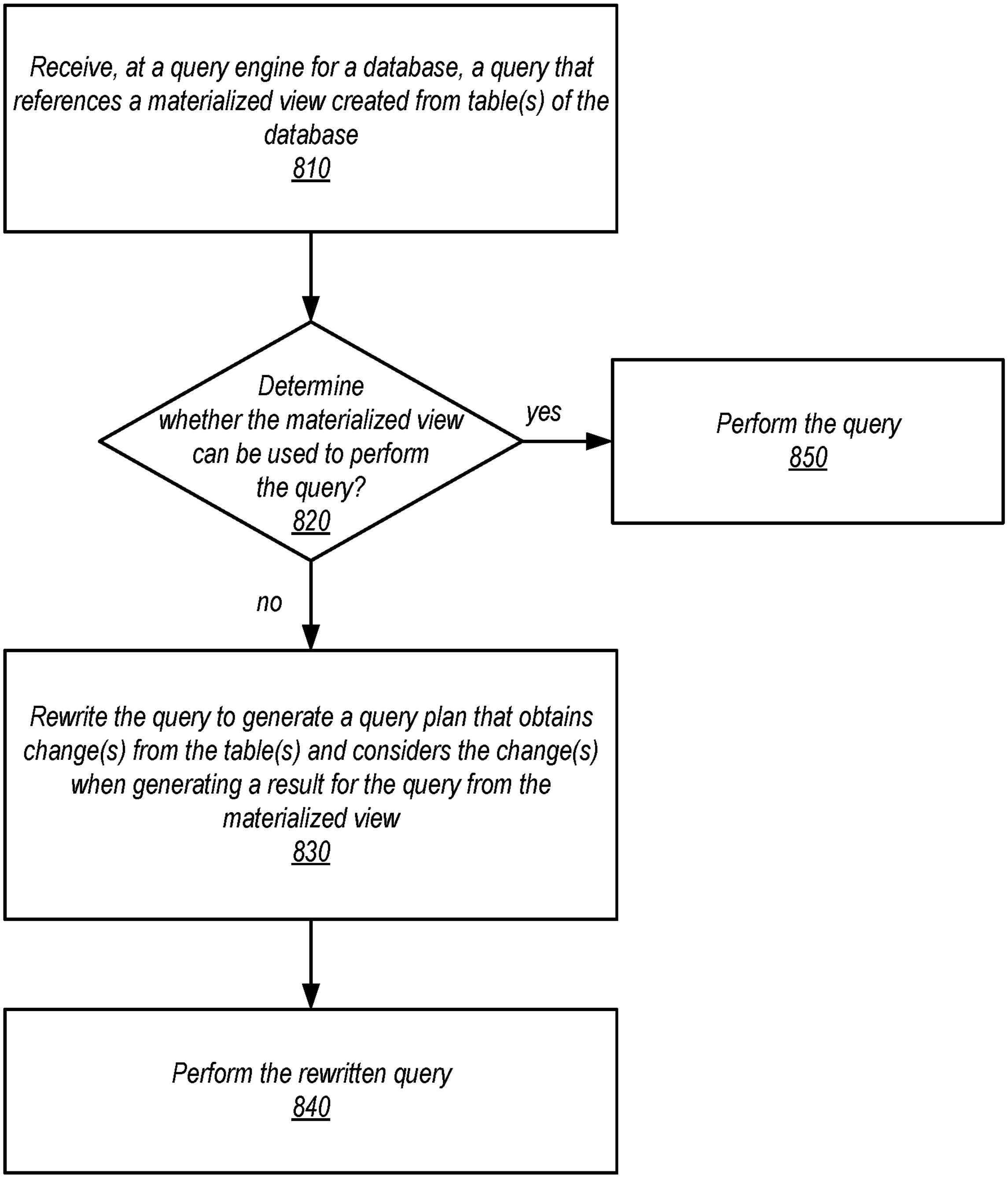
FIG. 8 is a high-level flowchart illustrating methods and techniques to implement rewriting queries to compensate for stale materialized views, according to some embodiments.
Figure 9:
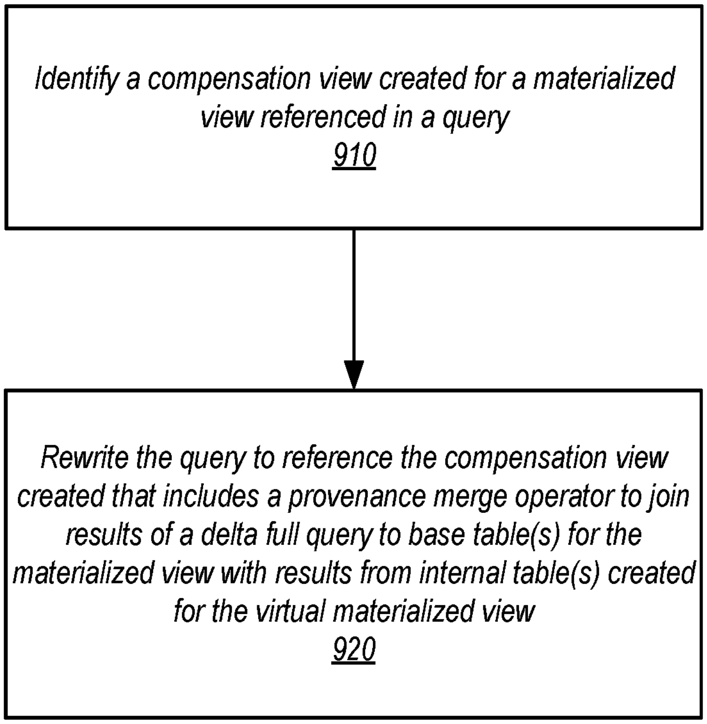
FIG. 9 is a high-level flowchart illustrating methods and techniques to implement rewriting queries to compensate for stale materialized views that are maintained utilizing stored procedures, according to some embodiments.
Figure 10:
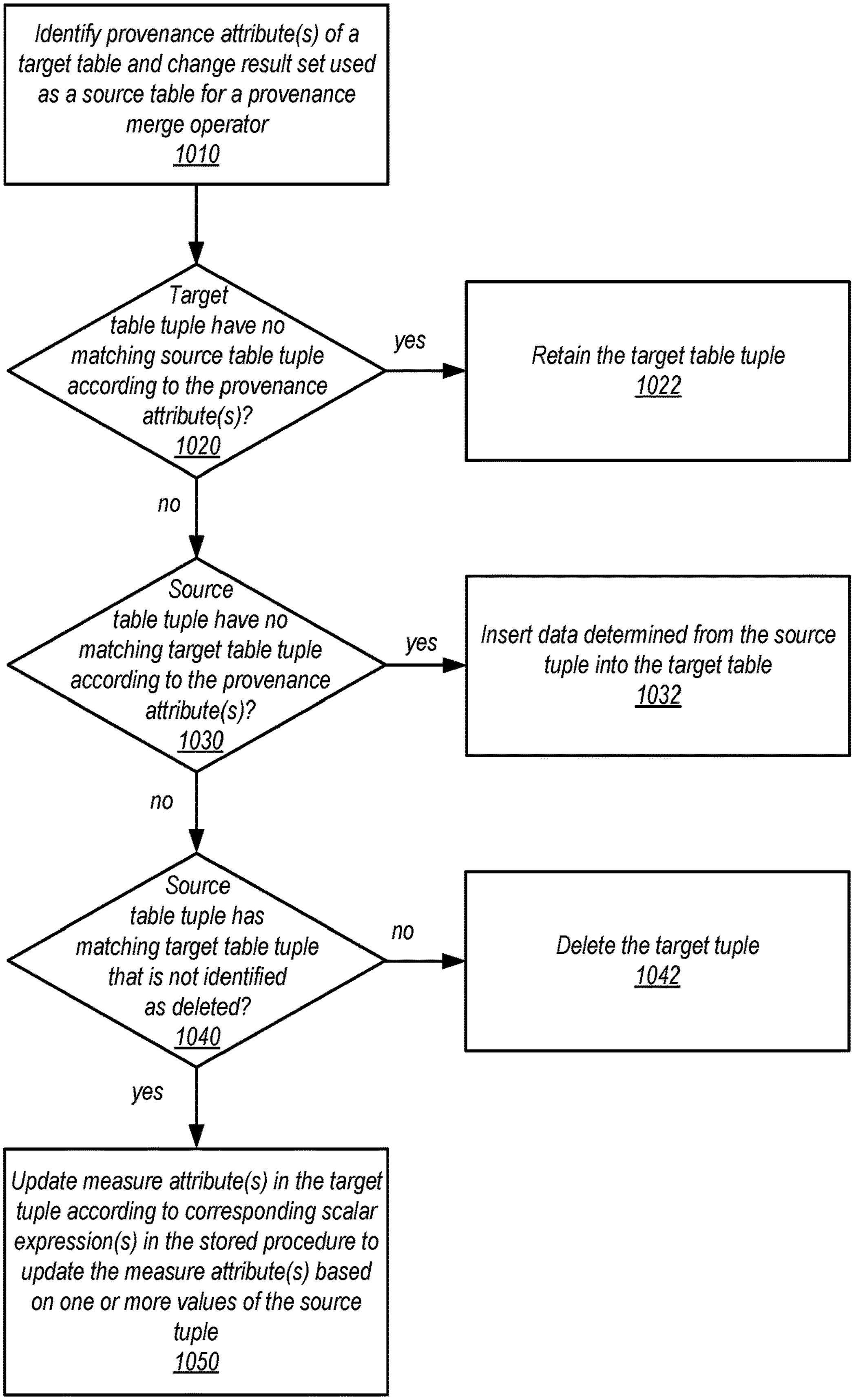
FIG. 10 is a high-level flowchart illustrating methods and techniques to implement a provenance merge operation that uses as an operand a change result set, according to some embodiments.

As discussed in more detail below with regard to FIGS. 6 and 9-10, query engine 120 may implement stale materialized view compensation 122 which may identify a referenced materialized view in a query, such as query 151, and determine whether the referenced materialized view is can be used to perform the query (e.g., based on metadata maintained for the materialized view 140 and/or table(s) 130). In some embodiments, the materialized view may actually be stale or likely to be stale. In either scenario, a use determination as discussed below with regard to FIG. 8 may indicate that the materialized view should not be performed without compensation. If stale, stale materialized view 122 may rewrite the query to generate a query plan that obtains the changes to allow the changes to be considered with the materialized view. For example, as illustrated in FIG. 1, query plan 152 may be generated that includes as operations of the query plan 152, an operation to get base table change(s) 153, as well as stale materialized view 154). Operations may be implemented in different ways. For instance, as discussed below with regard to FIG. 4, delta queries (e.g., delta delete and delta insert or delta full) can be generated to obtain changes based on transaction identifiers. In some embodiments, a compensation view may be used, in some embodiments, as discussed in detail below with regard to FIGS. 4 and 10, to replace the reference to the materialized view.

Query engine 120 may then perform the rewritten query using the generated query plan, in various embodiments. For example, query engine 120 may query 156 tables 130 for changes. Query engine 120 may also access 158 materialized view 140 in order to perform the query. Query plan 152 may include various operations to combine, incorporate, or include the materialized view 140 and obtained changes in order to provide query results 159, that are the same as would have been provided as if the querying was all performed upon table(s) 130 without utilizing materialized view 140. In this way, a current materialized view can be effectively provide without updating the materialized view itself. Moreover the updates can be included in the query without sacrificing much of the performance benefits for query processing that can be provided by using materialized view 140.

Please note that the previous description of a database, table, materialized view, query plan, and various interactions are logical descriptions and thus is not to be construed as limiting as to the implementation of these features.

This specification begins with a general description of a provider network that implements database services (or other data storage or processing services) that may implement using computer resources to perform database queries and implement materialized views, including rewriting queries to compensate for stale materialized views. Then various examples of one such database service, including different components/modules, or arrangements of components/module that may be employed as part of implementing the techniques are discussed. A number of different methods and techniques to implement rewriting queries to compensate for stale materialized views, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
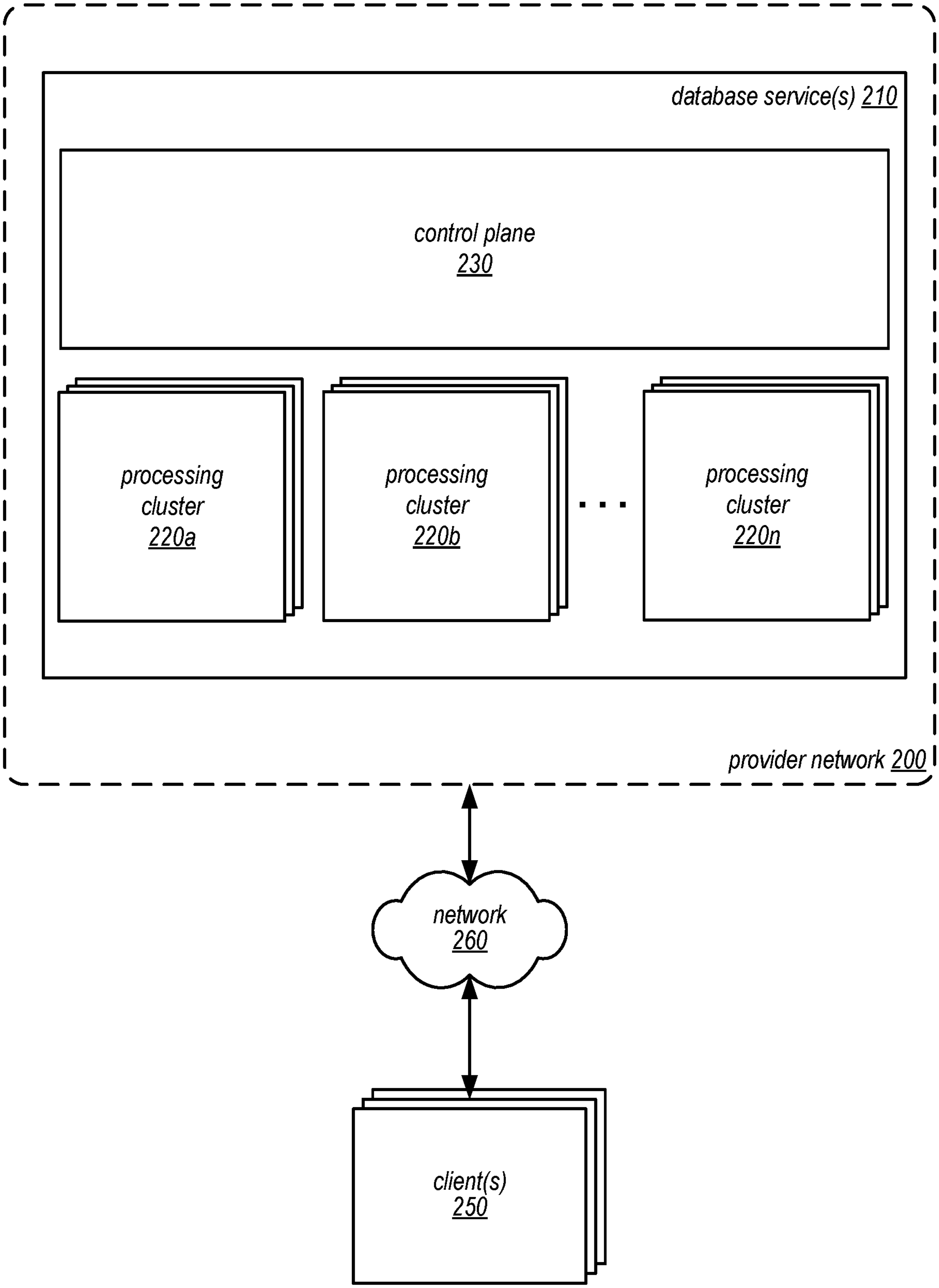
FIG. 2 is a logical block diagram illustrating a provider network offering a database service that provides materialized views for databases hosted in the database service, according to some embodiments.

FIG. 2 is a logical block diagram illustrating a provider network offering a database service that provides materialized views for databases hosted in the database service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 2000 described below with regard to FIG. 12, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220*a*, 220*b*, and 220*n* may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
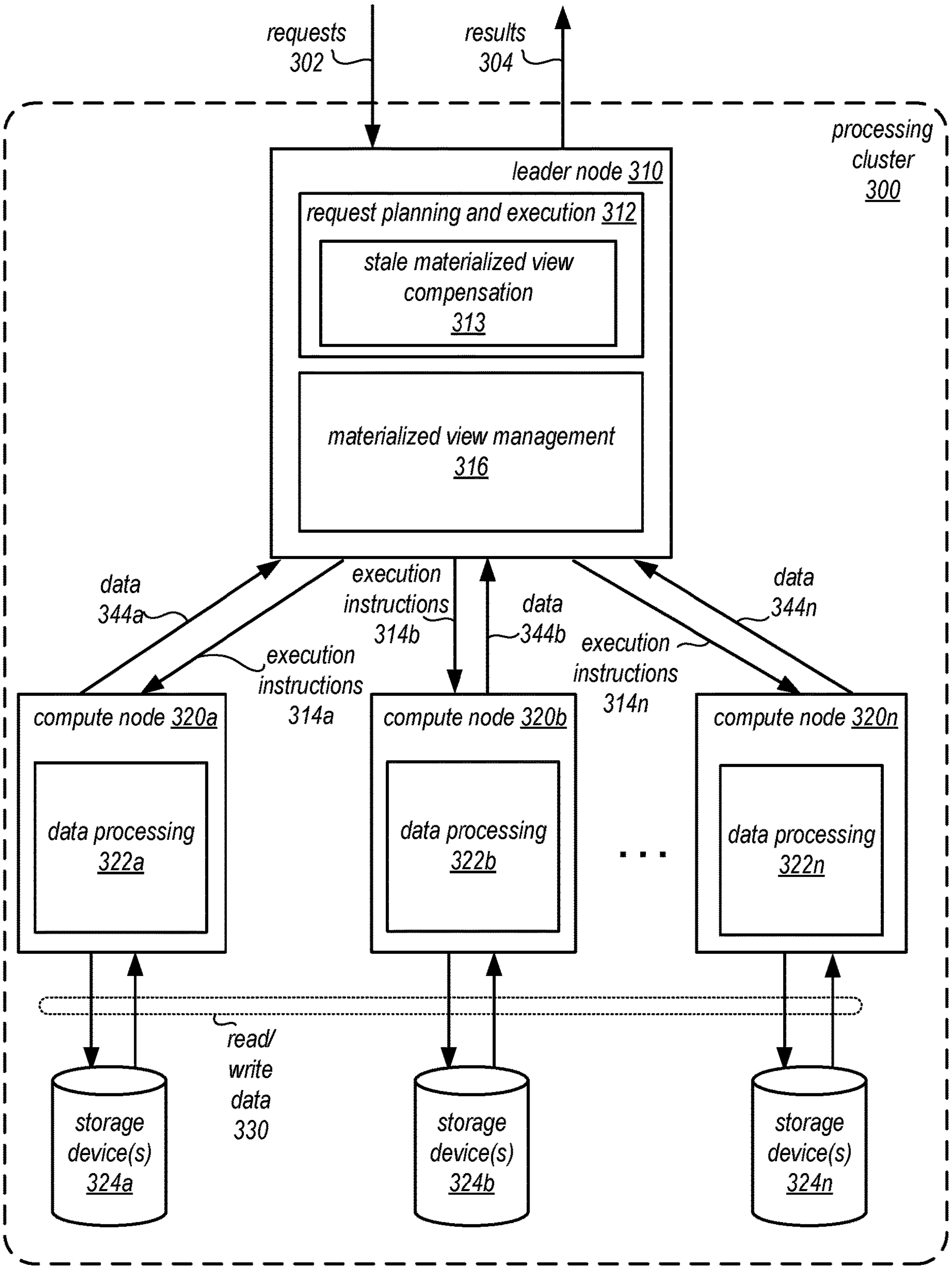
FIG. 3 is a logical block diagram illustrating a processing cluster of a database service that implements materialized view management to provide access to materialized views, according to some embodiments.

FIG. 3 is a logical block diagram illustrating a processing cluster of a database service that implements materialized view management to provide access to materialized views, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320*a*, 320*b*, and 320*n*, which may communicate with each other over a network or other interconnect (not illustrated), in one embodiment. Leader node 310 may implement request planning 312 to generate plan(s) and instructions 314 for executing various requests 302, such as query, or requests to update, add, modify, or remove data, on processing cluster 300, in one embodiment.

For example, request planning and execution 312 may implement stale materialized view compensation 313, as discussed in detail below with regard to FIGS. 4 and 6. A created materialized view may be provided by creating internal table(s) that cannot be directly referenced or accessed by a query (and a compensation view in some scenarios), in some embodiments. However, in other embodiments, when a request to create a materialized view is received, a table or other data structure that stores the materialized view that can be directly referenced and accessed by a query may be created. Instead, stale materialized view compensation 313 may perform techniques to rewrite or modify the performance of a query to access the materialized view, as discussed below with regard to FIGS. 6-10, using internal table(s) and/or stored procedures. Stale materialized view compensation 313 may, for instance, rewrite the query to access a compensation view that can be a combination view of internal tables without maintenance data, in some embodiments, or in other embodiments, stale materialized view compensation 313 may rewrite the query to access the internal tables directly (combining, modifying, and or removing undesired data as necessary). In some embodiments, a created materialized view may be actually created and stored as a view object which can be referenced (as opposed to internal tables). Such an actually created materialized view may also be referenced in queries and stale materialized view compensation can apply rewriting techniques to compensate for the directly accessible materialized view as well, in some embodiments, as discussed below with regard to FIG. 9.

Leader node 310 may implement materialized view management 316, discussed in detail below with regard to FIG. 4, to create and update materialized views. Leader node 310 may also implement metric planning history/performance metric collection (not illustrated) to collect and report performance metrics collected for various events, units of work, or other portions a query or other operation's performance, compute node or leader node performance, and history of operations performed, in some embodiments. As described herein, each node in a processing cluster 300 may include attached storage, such as storage device(s) 324*a*, 324*b*, and 324*n*, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344*a*, 344*b*, and 344*c*) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320*a*, 320*b*, and 320*n*. Compute nodes 320, may for example, be implemented on servers or other computing devices, such as those described below with regard to computer system 2000 in FIG. 12, and each may include individual query processing “slices” defined, for example, for each core of a server's multi-core processor, one or more data processing engine(s), such as data processing 322*a*, 322*b*, and 322*n*, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322*a*, 322*b*, and 322*n*, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324*a*, 324*b*, and 324*n*, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
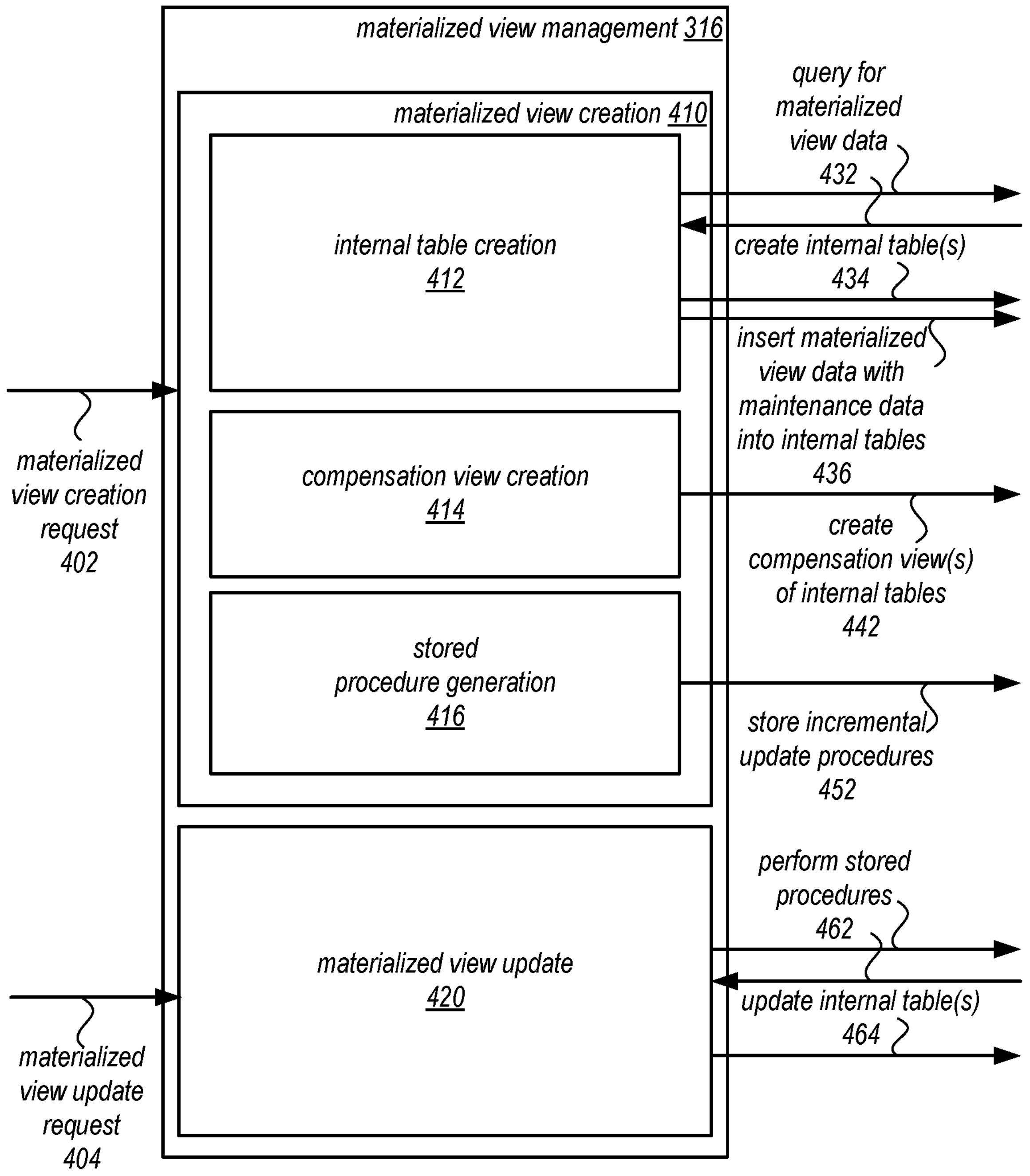
FIG. 4 is a logical block diagram illustrating materialized view management that implements materialized view creation and update, according to some embodiments.

FIG. 4 is a block diagram illustrating materialized view management that implements materialized view creation and update, according to some embodiments. Materialized view management 316 may perform various operations to create and update materialized views created from a database. Although illustrated as part of processing cluster 300 in FIG. 3, some or all features of materialized view management 316 may be implemented using separate resources. For example, a micro-service that performs materialized view incremental maintenance (e.g., for multiple different materialized views across different process clusters) may implement materialized view update 420. Similarly, a separate, spare, standby, or burst capacity processing cluster may be utilized to implement materialized view creation 410.

As illustrated in FIG. 4, in some embodiments, materialized view management 316 may implement materialized view creation 410. Materialized view creation 410 may manage, direct, or otherwise cause the creation of a materialized view (or the components, artifacts, or data objects for providing a materialized view), in some embodiments. For example, when a request to create a materialized view 402 is received, materialized view creation 410 may initiate a process or workflow to create different objects used to provide access to and incrementally update the requested materialized view.

Materialized view creation 410 may implement internal table creation 412. Internal table creation 412 may part, extract, or otherwise obtain a materialized view definition, which may be specified in materialized view creation request 402 or automatically detected or determined based on an analysis of frequently submitted queries, in some embodiments. The materialized view definition may specify what results are to be stored or provided by the materialized view to be created (e.g., by specifying what data, what data operations, and what format for the materialized view), in some embodiments. For example, a SQL statement may be used to select data, group or otherwise organize the results, apply predicates or other filtering criteria, apply or join data from multiple sources (e.g., tables), and operate upon the data (e.g., average, count, sum, etc.), among other features of a materialized view definition. Internal table creation 412 may then apply one or more table creation rules and/or criteria to determine the number and schema of constituent internal tables to provide the requested materialized view.

For example, one or more internal table creation rules and/or criteria may determine whether one or multiple internal tables are to be created in order to support incremental update of the internal tables. Consider a scenario where a request to create a materialized view is recited that specifies:

```
CREATE MATERIALIZED VIEW view_t AS
SELECT a, b, SUM(c) AS s FROM t GROUP BY 1,2;
```

Internal table creation 412 may determine which additional information (e.g., columns) and create the internal table for the materialized view as:

```
CREATE TABLE Internal view_t AS
SELECT a, b, SUM(c) AS s, COUNT(*) AS num_rec
  FROM T
GROUP BY a,b;
```

As part of determine how to create internal tables, internal table creation 412 may determine the provenance attributes of the materialized view (which in the example scenario may be the list "[a,b]"), in some embodiments. Note that internal tables may have more columns (e.g., the "num_rec" column) than the specified materialized view.

Figure 5A:
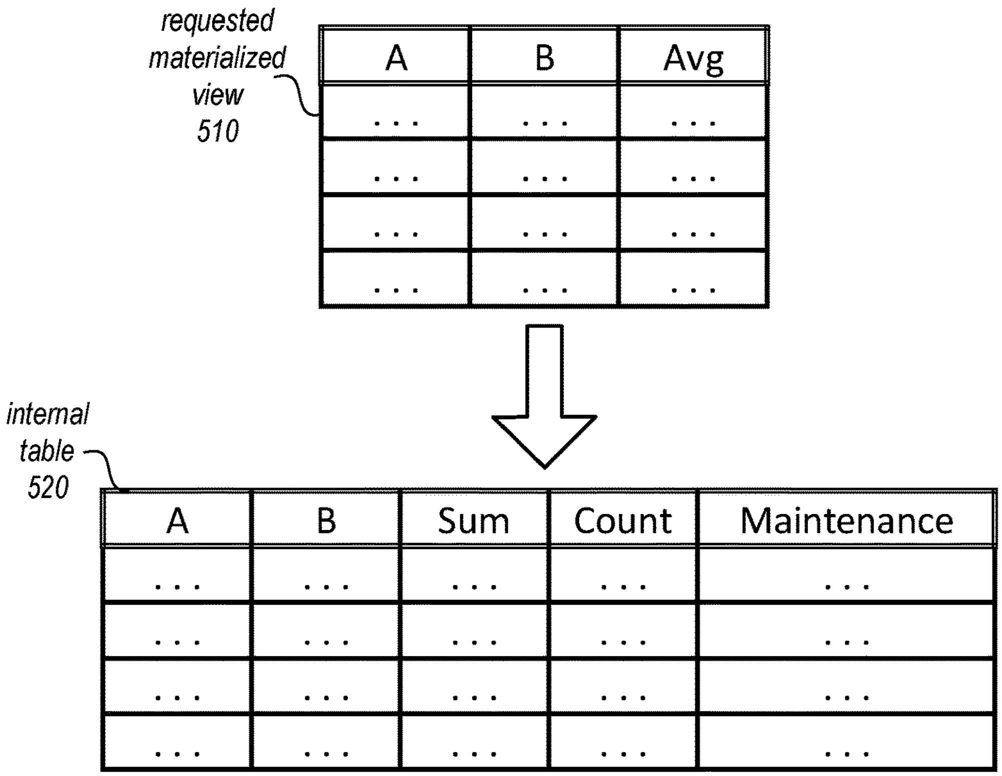
FIGS. 5A-5B illustrate example materialized views and internal tables for providing access to the materialized views, according to some embodiments.
Figure 5B:
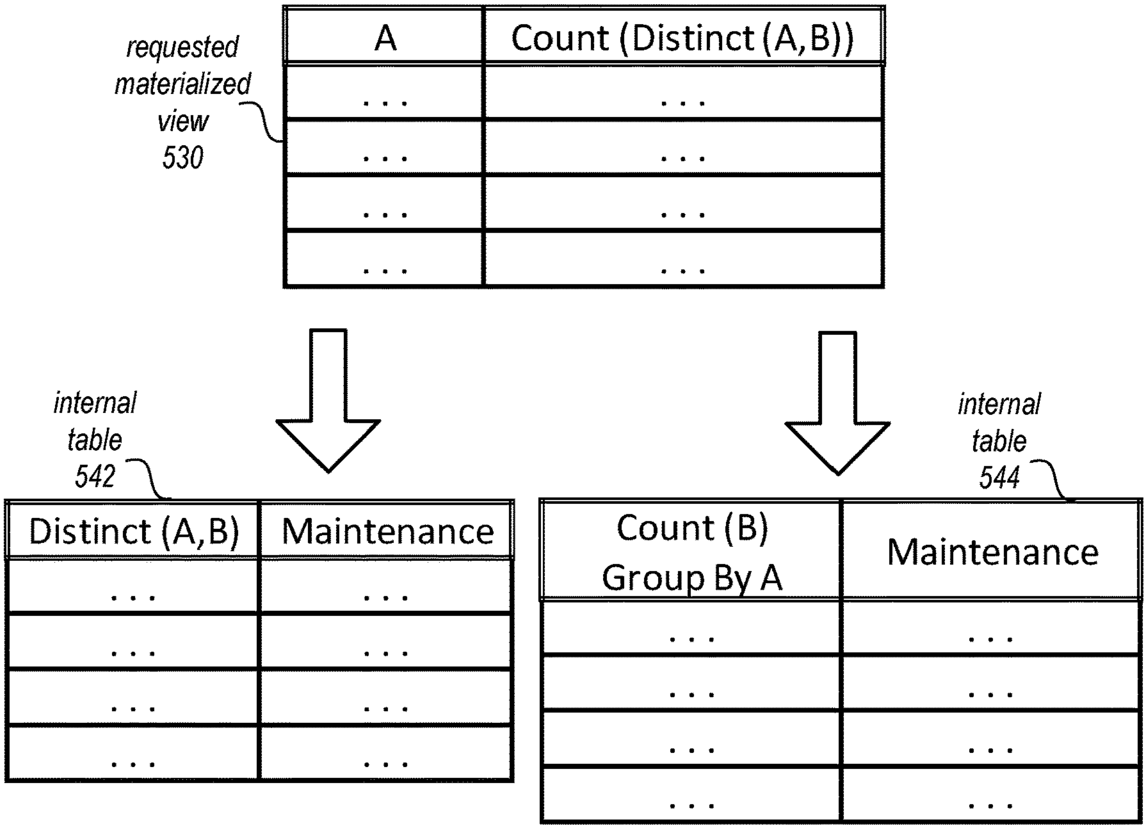

Further examples may illustrate other features of internal table creation 412. FIGS. 5A-5B illustrate example materialized views and internal tables for providing access to the materialized views, according to some embodiments. If, for example, a requested materialized view 510 provides a materialized view definition that includes an operation such as average, an internal table 520 may be created that determines component or constituent operations to determine the average. For instance, internal table 520 includes "Sum" and "Count" columns, which can then be updated to generate a current average value for an entry (e.g., by adding values to the sum and count columns, an updated average value can be determined). Note also that one or more additional columns for "Maintenance" may be created. For instance, transaction identifiers for the latest transaction to be committed and included in the internal table may be marked. Various other types of maintenance information for performing updates to internal tables can also be included.

In FIG. 5B, another technique for creating internal tables by internal table creation 412 is illustrated. Requested materialized view 530 may include as a feature of the materialized view, a "Count" operation that counts the "Distinct" pairings of A and B. Internal table creation 412 may create multiple tables for incremental maintenance of materialized view 530, such as internal table 542 and 544. In this example, the Count-Distinct feature is organized into two separate internal tables, where internal table 542 may maintain distinct pairings of A and B (as well as any appropriate maintenance information). Internal table 544 may maintain the count of B grouped by A (as well as any appropriate maintenance information). In this way a materialized view that asked, for instance, for a count of the unique items purchased by a customer (e.g., determined from a sales table) can be incrementally updated using the example internal tables 542 and 544.

Internal table creation 412 may perform the various operations (or issue instructions to another component, such as request planning and execution 312, in order to create the determined internal tables. For example, internal table creation 412 may issue one or more queries for materialized view data 432, create the appropriate number of internal table(s) 434 (with the determined schema), and then perform requests to cause the materialized view data to be inserted into the created internal tables, as indicated at 436.

In some embodiments, a compensation view may be created for internal tables in order to perform query rewriting to direct a query from a materialized view to the underlying data that provides the materialized view (e.g., the compensation view). Materialized view creation 410 may implement compensation view creation 414 in order to perform queries and perform one or more operations to create a compensation view 442 of internal tables for a materialized view. In some embodiments, compensation view creation 414 may utilize the same or similar stored procedures to generate the compensation view, as discussed in detail below, and may rely upon similar parameters such as the transaction identifier, and provenance attributes as determined above. For example, a compensation view may be described as:

```
CREATE VIEW Compensation_MV AS
  WITH Internal Compensation_MV AS
    // First exclude the live delta delete from
    // Internal_MV
    (SELECT *
      FROM Internal_MV i
      WHERE
        NOT EXISTS
      (SELECT *
        FROM <live delta delete query of MV>d
        WHERE d.<provenance attrl>=
        i.<provenance attrl>
        AND . . .
        AND d.<provenance attrN>=
        i.<provenance attrN>
        )
      UNION
      SELECT *
      FROM <live delta insert query of MV>
    )
  SELECT <attributes of the declared MV>
  FROM Internal Compensation_MV
```

In some embodiments, the "live delta delete query" may be described as:

```
SELECT *, oid
FROM source table
WHERE insertxid >MV_XID
AND deletexid=NOT_DELETED_XID
```

In some embodiments, the "live delta insert query" may be described as:

```
SELECT *, oid
FROM source table
WHERE insertxid <=MV_XID
AND deletexid >MV_XID
```

In some embodiments, a "live delta full query" may be used, for a compensation view which may be described as:

```
CREATE VIEW Compensation_MV AS
  WITH Internal Compensation_MV AS
    (PROV_MERGE
      Internal_MV AS TARGET
      USING
        <live delta full query of MV>AS SOURCE
      ON TARGET.[provenance_attribute_1]=
        SOURCE.[provenance_attribute_1],
        AND
        TARGET.[provenance attribute n]=
        SOURCE.[provenance attribute n]
```

```
        // update non-provenance attributes using
        // scalar expressions
        SET TARGET.measureAttrl=exprl,
        TARGET.measureAttrM=exprM
    )
    SELECT <attributes of the declared MV>
    FROM Internal Compensation_MV
```

As part of handling a create materialized view request 402, materialized view creation 410 may also generate stored procedures to update the materialized view (and in some embodiments to process a query directed to the materialized view). Materialized view creation may implement stored procedure generation 416. Stored procedure generation 416 may, in some embodiments, operate in two phases. In a first phase, stored procedure generation 416 may determine individual queries to obtain changes to one or more tables as "delta queries."

In some embodiments, different types of delta queries may be generated. For example, a delta insert query may be able to return data (e.g., committed tuples) inserted into a source table that are not subsequently deleted as:

```
SELECT *, oid
FROM source table
WHERE insertxid >=MV_XID
    AND insertxid <min(Lowest Active XID,
        Setup XID)
    AND deletexid=NOT_DELETED_XID
```

In the above example, it may be noted that the delta includes the row id (e.g., "oid"). The insertxid column in a source table row may contain the xid which inserted the row. Similarly, the deletexid column in a source table row may contain the xid which deleted the row. It is marked as NOT_DELETED_XID (e.g., a pre-defined value such as the maximum INT64 value) when it is not deleted, in some embodiments. As discussed below, delta queries may not be executed individually as standalone queries, in some embodiments. In such embodiments, the delta queries of the source tables maybe incorporated as subqueries of larger queries in delta scripts. Thus, in some scenarios the delta queries of base tables may have a SELECT * that may select useless columns. Once the delta query of the base table becomes part of the larger delta script, query optimization techniques may be applied to push relevant projections down, in some embodiments.

In some embodiments, another example of a delta query may be a delta delete query. For example, a delta delete query may be able to return data (e.g., committed tuples) deleted from a source table as:

```
SELECT *, oid
FROM source table
WHERE insertxid <=MV_XID
    AND deletexid <min(Lowest Active XID,
        Setup XID)
    AND deletexid >=MV_XID
```

In some embodiments, stored procedures may rely upon parameter values that may be generated at runtime, when the stored procedures are executed, such as transaction identifier (sometimes referred to as "xid"). For example, maintenance information or other metadata may be maintained to describe a materialized view transaction identifier ("MV_xid"), which may be the highest transaction identifier such that all transactions below MV_xid are both committed and already included or otherwise reflected in the internal table(s) for a materialized view. To determine MV_xid, a determination of the lowest, active transaction identifier may be relied upon. For instance, the lowest, active transaction identifier may be null if there are no active transactions.

Initially when creating internal tables, materialized view creation 410 (or internal table creation 412) may set the MV_xid to the lowest, active transaction identifier, if there is at least one active transaction, or to some setup transaction identifier (if there is not active transaction).

In some embodiments, instead of using the MV_xid parameter, the full list of active transaction identifiers at the time that a materialized is updated may be considered. Then, MV_xid may be changed to "xid of the IVM Update transaction that updated the view." but materialized view maintenance 420 may store in persistent metadata the list of active transaction identifiers. This list signifies that these transactions may not be reflected in the state of the MV yet. In the next round of maintenance, materialized view maintenance 420 may examine the transactions of the list that are not active any more so that such transactions will be included in the delta queries, even though their transaction identifiers will be less than MV_xid.

In some embodiments, another example of a delta query may be a delta full query. For example, a delta full query may be able to return the union of the delta insert and the delta delete where every tuple coming from the delta insert also has an attribute num_rec set to 1 and every tuple of delta delete has num_rec=−1, and may be described as:

```
SELECT *, oid, CASE WHEN . . . inserted . . . THEN 1
    ELSE −1
    END AS num_rec
FROM source table
WHERE
    (insertxid >=MV_XID
    AND insertxid <min(Lowest_Active_XID,
    IVM Updater XID)
    AND deletexid=NOT_DELETED_XID)
    OR
    (insertxid <=MV_XID
    AND deletedxid <min(Lowest_Active_XID,
    IVM Updater XID)
    AND deletexid >=MV_XID)
```

In various embodiments, the delta full query for updating a materialized view may describe both the tuples that are to be inserted and the tuples that are to be deleted from a view, using a same num_rec convention (e.g., +1 or −1 for delta fulls of source tables in the example above). However, in some embodiments in the presence of aggregate views the num_rec may be any number—not just +1 or −1.

Consider an example materialized view, described as:

```
CREATE MATERIALIZED VIEW AggMV
    SELECT sgroup, sum(smeasure) AS agg
    FROM S
    GROUP BY sgroup;
```

The internal table generated for the materialized view may be described as:

```
CREATE TABLE Internal_AggMV AS
    // Notice that the num_rec counts how many S
    // tuples belong to each group
    SELECT sgroup, sum(smeasure) AS agg,
        count(*) AS num_rec
    FROM S
    GROUP BY sgroup;
```

In such an example, because the internal tables carry num_rec's that describe the sizes of the underlying groups, the delta full may describes how these numbers go up and down as the base tables change. In this way, operators in a stored procedure can add up the num_rec's coming from the internal table and those coming from the delta full and act accordingly to update measure attributes, like smeasure. Thus, in some embodiments, a change result (e.g., generated by a delta full query) may include respective variance values (e.g., num_rec) for fields of the columns used to calculate the actual values of the fields in individual tuples in the respective change result set. In other embodiments, the actual values (instead of the variance values) may be included in the respective change result set so that the actual values can be used instead of calculating values (e.g., where the actual values are used to update an internal table with the actual values).

In a second phase, stored procedure generation 416 may generate a script to be stored 452 as stored procedures for execution, which may incorporate the generated delta queries. Similar to internal table creation 412 and compensation view creation 414, stored procedure generation 416 may apply one or more rules or criteria for assembling a stored procedure to perform updates to a materialized view. The stored procedures generated for materialized views may be stored 452 and/or invoked similar to other stored procedures created by a user of the database, in some embodiments. Then when events or requests that cause an update the materialized view occur, the stored procedures may be invoked as part of the update, in various embodiments. For example, materialized view management 316 may also implement materialized view update materialized view update 420.

Materialized view update 420 may perform stored procedures 462 in order to obtain the changes to the materialized view and then perform one or more requests to update the internal tables 464. For instance, requests to insert, modify, or delete values in entries of one or more internal tables may be requested. The timing of incremental updates to materialized views may occur in many ways. For example, an automated and/or background process may tracking the amount of time elapsed or change in the database elapsed since a last update, and then trigger an update to the materialized view. In some embodiments, requests from other components (e.g., from query planning and execution 312) or from a user command to "REFRESH" (as indicated at 406) the materialized view may cause the initiation of an update to the materialized view.

Figure 6:
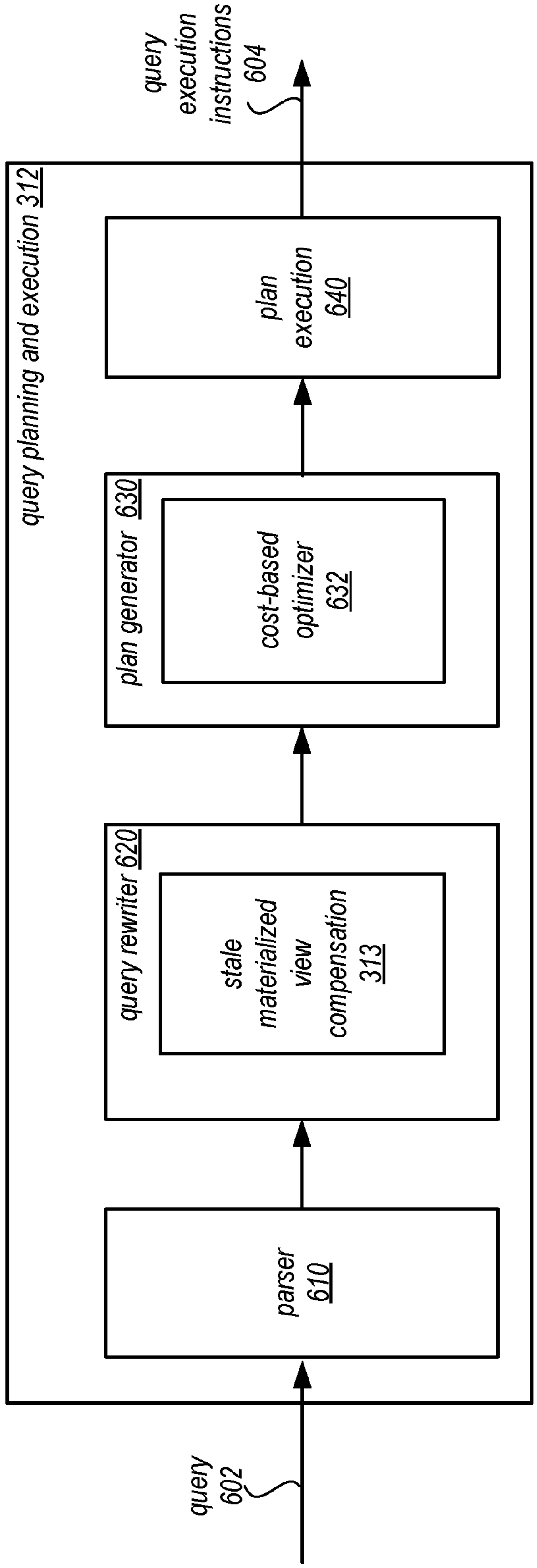
FIG. 6 is a logical block diagram illustrating query planning for a query engine implemented by a processing cluster that implements rewriting queries to compensate for stale materialized views, according to some embodiments.

FIG. 6 is a logical block diagram illustrating query planning for a query engine implemented by a processing cluster that implements rewriting queries to compensate for stale materialized views, according to some embodiments. Query planning and execution 312 may implement parser 610 to receive a query statement, such as a SQL statement, and determine the various requested operations to perform as a result of the query. For example, parser 610 may generate a query tree for a given query input string to separate out the various query clauses, fields, predicates, conditions, commands, or other query information for planning and optimization.

Query planning and execution 312 may implement query rewriter 620 to rewrite the parsed query, in some embodiments. For example, as discussed above with regard to FIG. 1 and below with regard to FIGS. 8 and 9, query rewriter 620 may implement stale materialized view compensation 313 to identify whether a materialized view referenced can be used to perform a query (e.g., whether a materialized view is or likely to be stale). For example, metadata describing the database (e.g., various tables, statistics, schemas, or other information that can be used to handle queries) may be accessed to indicate whether a materialized view is up-to-date. In some embodiments, the metadata may indicate whether a materialized view is created as a view object that is directly accessible or created as one or more internal tables that can be updated according to incremental maintenance view techniques, which may indicate whether internal tables, compensation view, or the materialized view itself is to be referenced in the rewritten query.

Stale materialized view compensation 313 may determine how to rewrite the query, in various embodiments, to obtain changes made to base tables for a materialized view (whether a directly accessible materialized view or materialized view created with internal tables). For example, for a materialized view created with internal table(s), stale materialized view compensation 313 may access metadata or other mapping information for the materialized view created using internal table(s) that identifies a compensation view (as discussed above with regard to FIG. 4 and below with regard to FIG. 10), and then rewrite the query to include that compensation view in place of the materialized view. For a directly accessible materialized view, stale materialized view compensation may rewrite the query to include delta queries (e.g., insert/delete or full) and may include new operators, such as the provenance merge operator discussed in more detail below with regard to FIGS. 10 and 11.

Figure 7:
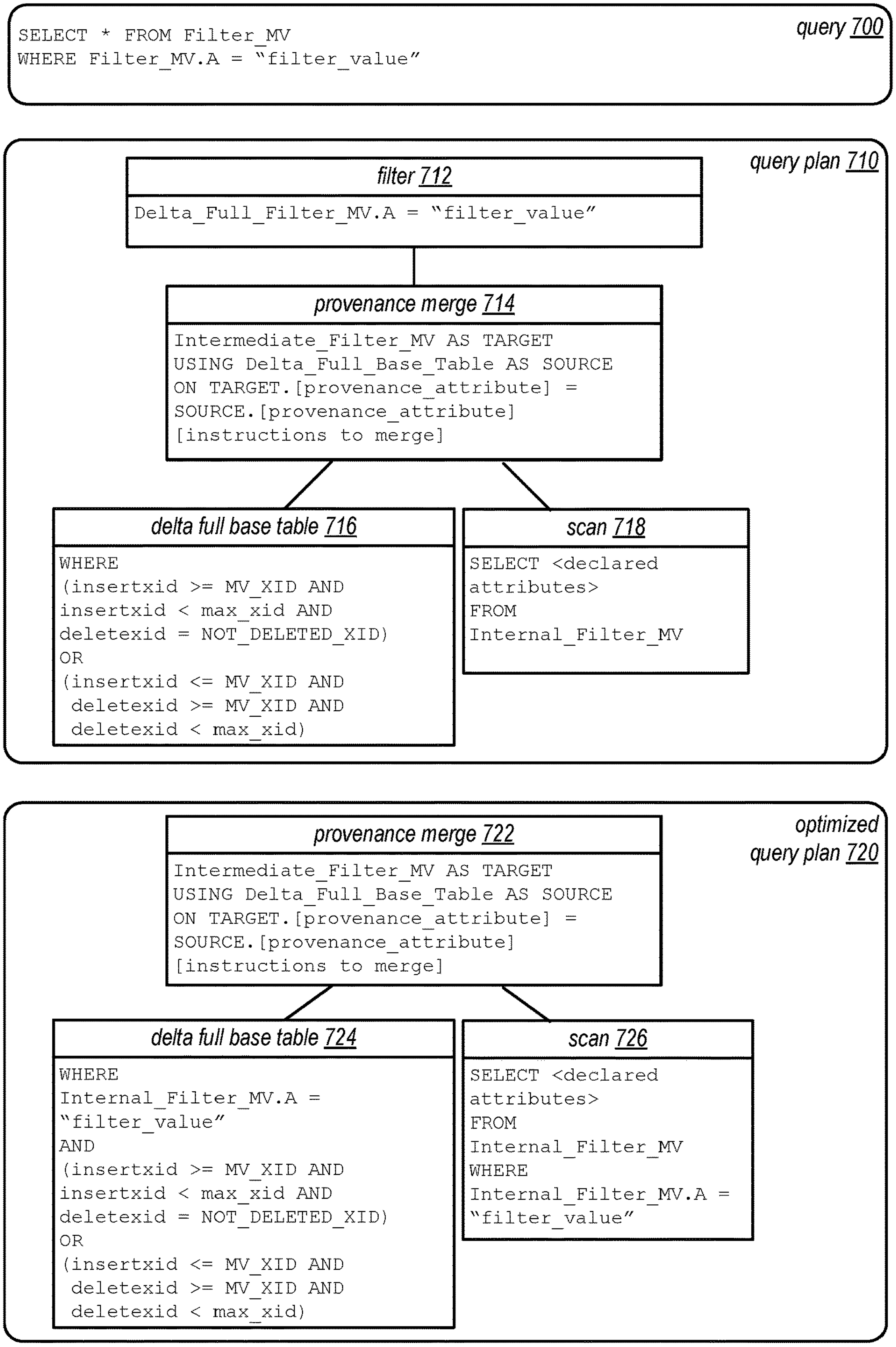
FIG. 7 is an example illustration of an optimization that may be performed for a rewritten query that includes a provenance merge operator, according to some embodiments.

Query rewriter 620 may also perform other rewrites to further optimize performance of the query once the changes to be incorporated along with the stale materialized view are identified. For example, query rewriter 620 may have access to metadata (e.g., table descriptions or definitions, including the names and data types of each column, physical information (e.g., partitions information), number of rows, number of distinct values, value ranges, value cardinality, value distribution, indexes, views, etc.), to rewrite portions of a query tree, such as changing the location or ordering of predicates, join operations, or other portions or operations in the query tree, including the operations added to obtain the changes to base tables for the stale materialized view. FIG. 7 is an example illustration of an optimization that may be performed for a rewritten query that includes a provenance merge operator, according to some embodiments.

For example, query 700 may include a reference to a materialized view, "Filter MV" and then perform a SELECT on the materialized view to obtain values for column (or attribute, field, etc.) that equal "filter value." An initial rewrite for the query may result in a query plan, as illustrated in FIG. 7. For example, a delta full query for the base table(s), as indicated 716, may be performed to obtain the inserts (e.g., "(insertxid >=MV_XID AND insertxid <max_xid AND deletexid=NOT_DELETED_XID)) and the deletes (e.g., "(insertxid <=MV_XID AND deletexid >=MV_XID AND deletexid <max_xid). A scan 718 may return as an intermediate result/table the currently stored values of the declared attributes in the stale materialize view internal table (e.g., excluding maintenance information), "Intermediate Filter MV". Then, provenance merge operator 714 may use the intermediate table as the TARGET for the merge on provenance attributes with the source for the merge being the result of the delta full base table query (e.g., "Delta_Full_Base_Table"). Then, as indicated 712, a filter may be applied to limit results those of the output of the provenance merge (e.g., "Delta_Full_Filter_MV") with an "A" value of "filter value."

By rewriting a query to obtain and incorporate changes to base tables directly into the query (instead of first updating the materialized view), various rewrites and other optimizations can be performed to improve performance of the query. For example, optimized query plan 720 may push down the filter into the delta full base table query 724 and scan 726 of the Interal_Filter_MV. In this way, less data is returned and merged at provenance merge operator 722. Various other rewrites may be performed, both as rewrites or plan optimizations.

The rewritten query may then be provided to plan generator 630. Plan generator 630 may perform various operations to generate a query execution plan (e.g., a tree of plan operation nodes, which may be later used to generate query execution code). For example, plan generator may perform a cost-based optimization to select one of various combinations or orderings of plan operator nodes in a tree produces a least costly plan to execute. Plan generator 630 may also implement partition elimination, which may use metadata to filter out partitions (e.g., portions of or entire data objects) from evaluation for executing the query. For example, partition elimination may receive a list of predicates as part of query 602 and along with a list of partitions (for local and/or remote data) along with range values or other information describing the values stored within the partitions. If an evaluation of a predicate compared with the range values or other value description information were to exclude that partition from satisfying the query predicate (e.g., values in the partition are out of a range for the predicate), then operations to evaluate (e.g., scan) the partition may be removed. In scenarios where the partitions removed are partitions of remote data, in addition to saving processing costs, removal of partitions would save transmission costs (e.g., network bandwidth) to move results from remote data.

Request planning and execution 312 may implement plan execution 640. Plan execution 640 may receive the selected query plan, generate instructions to perform the query plan, and send the query execution instructions (e.g., to compute nodes of a processing cluster in FIG. 3). For example, the instructions may be generated and sent as code (or executables).

Although FIGS. 2-7 have been described and illustrated in the context of a database service, like a data warehouse service implementing a columnar relational database table, the various components illustrated and described in FIGS. 2-7 may be easily applied to other database or data storage systems that provide materialized views of database data. As such, FIGS. 2-7 are not intended to be limiting as to other embodiments of a storage engine, query engine, a single or distributed database engine or management system, processing cluster, or other component that may implement using computer resources to perform queries that reference materialized views, including resources, hosts, systems, or devices that are separate from the query engine or database management system itself (e.g., an external data replication store or system). FIG. 8 is a high-level flowchart illustrating methods and techniques to implement rewriting queries to compensate for stale materialized views, according to some embodiments. Various different systems and devices may implement the various methods and techniques described below, either singly or working together. For example, a processing cluster, such as described above with regard to FIGS. 2-7 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 810, a query may be received at a query engine that references a materialized view created from table(s) of the database, in some embodiments. As noted above, in some embodiments, materialized views may be created as a table or other data structure in storage that stores the results of the materialized view definition, which can then be directly accessed or otherwise queried against. In some embodiments, materialized views that are created by creating one or more internal tables (which cannot be directly queried or referenced by query), stored procedures, and a compensation view.

As indicated at 820, a determination may be made as to whether the materialized view can be used to perform the query. For example, a last committed transaction identifier for the table(s) that create the materialized view may be compared with a transaction identifier for a last included transaction in a materialized view. If the transaction identifiers do not match, then the materialized view may possibly be stale, and thus may not be considered usable to perform the query. In some embodiments, an estimation or likelihood of whether the materialized view is stale, such as based on time passed since last update, amount or number of changes, or other criteria may be evaluated. In some embodiments, when an update or other change is made to a table that is part of materialized view definition is received, as part of performing the update or other change, the corresponding materialized view is marked as stale (e.g., in metadata for the materialized view).

As indicated at 830, if the materialized view is cannot be used to perform the query, then the query may be rewritten to generate a query plan that obtains changes from the table(s) not included in the materialized view and considers the change(s) when generating a result for the query from the materialized view, as indicated at 830. For example, delta queries, such as the delta full query or combined delta insert and delta delete queries may added to obtain the change(s), in some embodiments. In some embodiments, these changes may be merged with the stale materialized view. In some embodiments, these changes may be used to update the materialized view (e.g., where the provenance merge operator target is the internal table) and provide the result back for the query. Various other rewrite optimizations to reorder other portions of the query after the inclusion of the features in the query to obtain the changes may be made. For example, join orders may be changed and filters pushed down, among other optimizations.

As indicated at 840, the rewritten query may be performed, in some embodiments. For example, the query plan may be executed and results returned that are the same as would be returned if the query were directed to the table(s) instead of the materialized view. If, however, the materialized view is can be used to perform the query, then as indicated at 850, the query may be performed without being rewritten to compensate for the stale materialized view.

For materialized views with incremental updates enabled, internal tables may be stored (instead of a non-virtual materialized view). Thus, rewrite techniques may need to compensate for internal tables, which may include additional information and/or need further computation to provide the specified attributes of the materialized view (e.g., an average value may need to be calculated from stored sum and count values). In some embodiments, the rewrite may perform these additions to internal tables. In at least some embodiments, a compensation view may be created when the materialized view is created which can be used when the materialized view is referenced. FIG. 9 is a high-level flowchart illustrating methods and techniques to implement rewriting queries to compensate for stale materialized views that are maintained utilizing stored procedures, according to some embodiments.

As indicated at 910, a materialized view referenced in a query may be identified as a virtual materialized view, in some embodiments. For example, the materialized view referenced may have been created with incremental maintenance enabled, which may include storing metadata or other information that marks the materialized view as virtual.

As indicated at 920, the query may be rewritten to reference a compensation view created for the virtual materialized view that includes a provenance merge operator to join results of a delta full query to base table(s) for the virtual materialized view with results from internal table(s) created for the virtual materialized view, as indicated at 920. For example, as illustrated above in FIG. 7, the query plan 720 or optimized query plan 730 could be compensation views (or implemented as part of a compensation view) which use the provenance merge operator, discussed below with regard to FIG. 9 to implement merging changes to make a materialized view current. Other compensation views may rely upon other operations instead of a provenance merge, or may simulate a provenance merge, as discussed below with regard to FIG. 10.

A provenance merge operator may provide a relational algebra operator that can take advantage of the format of the change result set for a base table including all changes made to a base table, in order to merge and produce updated intermediate tables in a plan as well as internal tables for a materialized view that include the changes in a change result set. FIG. 10 is a high-level flowchart illustrating methods and techniques to implement a provenance merge operation that uses as an operand a change result set, according to some embodiments. As indicated at 1010, provenance attribute(s) of a target table and change result set used as a source table for a provenance merge operator may be identified. For example, the provenance attribute(s) may be identified from the material view definition, as the columns which are included in a materialized view and for which other attributes that are measures (e.g., count, sum, aggregation, average, etc.) are determined.

Provenance attributes may be used to compare tuples from the target table (e.g., the internal table to be updated) and the source table (e.g., the change result set). For example, as indicated at 1020, a determination may be made as to whether a target table tuple has a matching source table tuple according to the provenance attributes, in some embodiments. If not, then the target table tuple may be retained, as indicated at 1022 (e.g., as the target table tuple was not updated by not being found in the source table, which is the result set of changes). As indicated at 1030, if a source table tuple has no matching target table tuple according to the provenance attributes, as indicated by the positive exit from 1030, then data determined from the source table tuple may be inserted into the target table, in some embodiments, as indicated at 1032. For example, if the target table is an internal table (as discussed above with regard to FIGS. 5A and 5B) that records sum and count values in order to provide an average value in the final materialized view, then the sum and count values for a new tuple in the target table may be determined from the source tuple when inserting the data into the target table (either into an existing or new tuple in the target table).

In some scenarios, a matching source table tuple and target table tuple may occur. As indicated at 1040, a determination may be made as to whether the matching tuple should be deleted. For example, as discussed above, the num_rec values included in the change set result could be include a value of −1, to indicate that the tuple has been deleted. In other embodiments, other deletion indications may be made (e.g., tombstones or other markers) that that a tuple has been deleted may be included in the tuples (or found when scanning for tuples, such as a deleted tuple list). If matching tuples are found but the source table tuple is identified for deletion, then as indicated at 1042, the matching target table tuple may be deleted.

If the source table tuple is not to be deleted, then updates to non-provenance attributes may need to be determined, in some embodiments. In some embodiments, non-provenance attributes may be referred to as measure attributes. As indicated at 1050, the measure attribute(s) may be updated in the target table tuple according to corresponding scalar expressions in the stored procedure to update the measure attribute(s) based on one or more values of the source table tuple. For example, if a measure attribute is a Sum value, then the scalar expression to update the value may be an addition operation (to add a new value to the measure). Various other types of scalar expressions may be specified in order to provide the measure attribute values, such as sum, count, average, minimum, and maximum, by specifying how to compute an updated sum, count, average, minimum, maximum).

In addition to the provenance merge operator technique described above, other operations may be used to simulate or provide the same effect as provenance merge operator, without such an operator being supported for stored procedures at a database. FIG. 11 is an example script to implement a simulated provenance merge operation 1110, according to some embodiments.

As indicated at 1120, a temporary table may be created to store change result sets (e.g., generated by a delta full query), in some embodiments. The arrangement of data in the temporary table may be specified using the provenance attributes (e.g. as illustrated by the specified Distkey and Sortkey. As indicated at 1130, a query may be performed upon the temporary table to identify those tuples that exist in the one or more internal tables with measure attributes to be updated. For example, the "Else" condition identifies a scalar expression that can be used to updated a measure attribute. Such updates may be made to corresponding tuples in the internal table. As indicated at 1140, the temporary table may be queried to identify those tuples in the temporary table to be inserted into the one or more internal tables. Then, the identified tuples from the temporary table may be inserted into the one or more internal tables.

As indicated at 1150, the temporary table may then be queried to identify those tuples in the temporary table identified as deleted, in some embodiments. For example, the num_rec technique or tombstone markers, as discussed above may be used in tuples to indicate deleted tuples. Then, the identified tuples may be deleted from the one or more internal tables.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of rewriting queries to compensate for stale materialized views as described herein may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/ output devices may be separate from computer system 2000 and may interact with one or more nodes of computer system 2000 through a wired or wireless connection, such as over network interface 2040.

Figure 12:
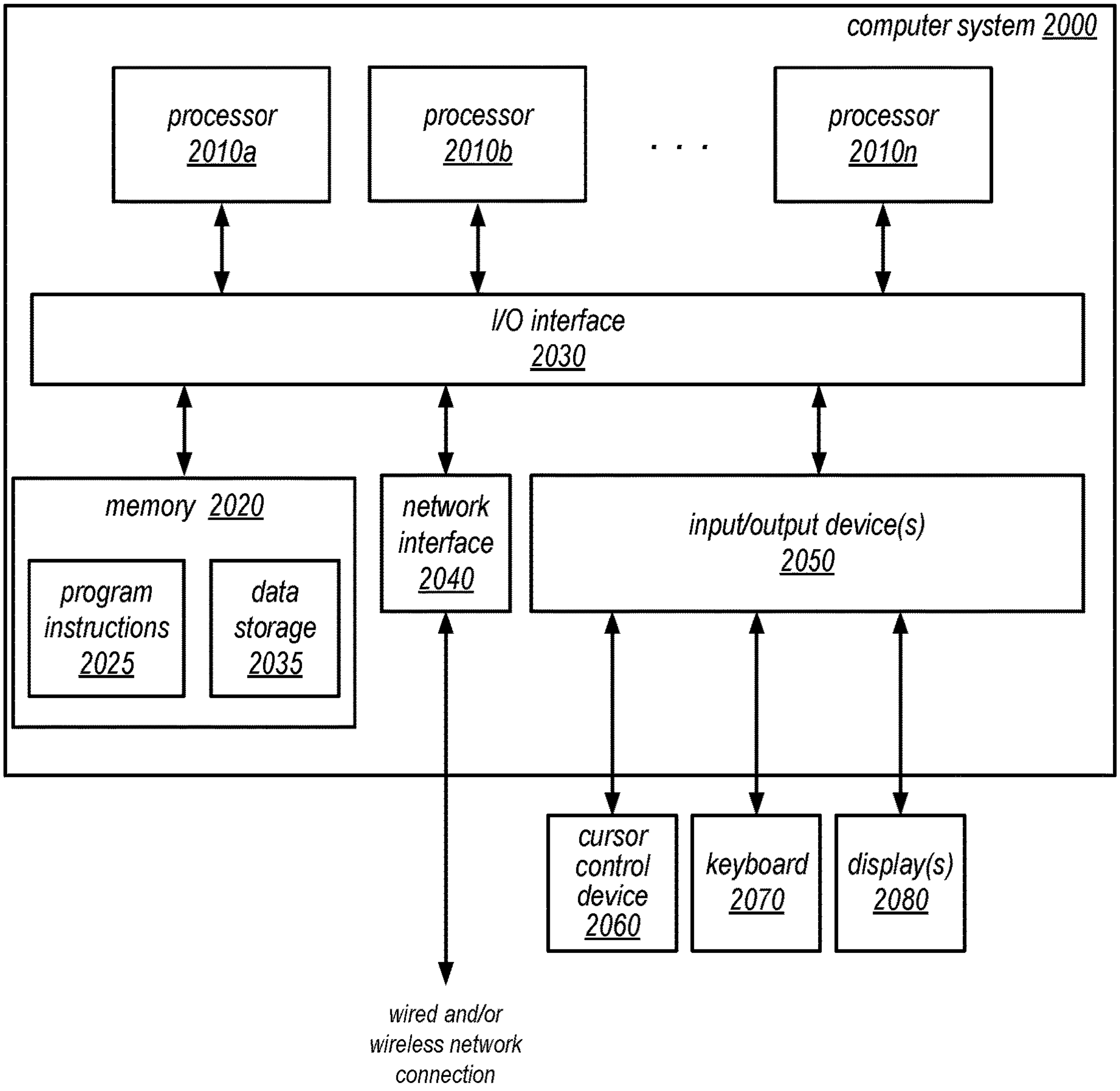
FIG. 12 illustrates an example system to implement the various methods, techniques, and systems described herein, according to some embodiments.

As shown in FIG. 12, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a query engine for a database, the query engine configured to:

receive a query that references a materialized view created from one or tables of the database;

determine that the materialized view of the database cannot be used to perform the query;

rewrite the query to generate a query plan that:

queries, to using one or more transaction identifiers generated at runtime as parameter values for one or more stored procedures that are created as part of creating the materialized view, the one or more tables of the database from which the materialized view was created to obtain one or more changes made to the one or more tables; and incorporates the one or more changes directly into generating a result for the query to be consistent with an up-to-date version of the materialized view; and perform the rewritten query; and return a result for the rewritten query.

2. The system of claim 1, wherein one or more internal tables and a compensation view were created when the materialized view was created, wherein the compensation view comprises one or more operations to compensate the one or more internal tables by obtaining the one or more changes, and wherein to rewrite the query to generate the query plan, the query engine is configured to rewrite the query to replace the reference to the materialized view with a reference to the compensation view.

3. The system of claim 1, wherein the query engine is implemented as part of a data processing cluster of a data warehouse service implemented as part of a provider network, and wherein a request to create the materialized view was received through an interface of the data warehouse service that enabled incremental maintenance for the materialized view by the data warehouse service.

4. The system of claim 1, wherein the one or more stored procedures include a provenance merge operation to consider the obtained one or more changes.

5. A method, comprising:

receiving, at a query engine for a database, a query that references a materialized view created from one or tables of the database;

determining that the materialized view of the database cannot be used to perform the query;

rewriting the query to generate a query plan that obtains one or more changes made to the one or more tables from the one or more tables used in the creation of the materialized view using one or more transaction identifiers generated at runtime as parameter values for one or more stored procedures that are created as part of creating the materialized view, and incorporates the one or more changes directly into generating a result for the query from the materialized view; and performing, by the query engine, the rewritten query.

6. The method of claim 5, wherein the one or more stored procedures include a provenance merge operation to consider the obtained one or more changes.

7. The method of claim 6, wherein an internal table to provide the materialized view was created in response to a request to create the materialized view and wherein a target of the provenance merge operation is an intermediate table generated from the internal table.

8. The method of claim 6, wherein the one or more stored procedures further include a delta full query to obtain the one or more changes, wherein the delta full query is a source of the provenance merge operation.

9. The method of claim 5, wherein the one or more stored procedures further include a delta insert query and a delta delete query to obtain the one or more changes.

10. The method of claim 5, wherein performing the written query provides the result that is consistent with an up-to-date version of the materialized view.

11. The method of claim 5, wherein the materialized view is directly accessible by a client application.

12. The method of claim 5, wherein rewriting the query to generate the query plan comprises:

identifying the materialized view as a virtual materialized view; and replacing the reference to the materialized view with a compensation view created for the materialized view.

13. The method of claim 5, further comprising:

before the one or more changes are made to the one or more tables:

receiving another query that references the materialized view;

determining that the materialized view is not stale; and performing the other query.

14. One or more non-transitory, computer-readable storage media, storing program instructions that when executed on or across one or more computing devices cause the one or more computing devices to implement a query engine for a database that implements:

receiving a query that references a materialized view created from one or tables of the database;

determining that the materialized view of the database cannot be used to perform the query;

rewriting the query to generate a query plan that obtains one or more changes made to the one or more tables from the one or more tables used in the creation of the materialized view using one or more transaction identifiers generated at runtime as parameter values for one or more stored procedures that are created as part of creating the materialized view, and incorporates the one or more changes directly into generating a result for the query from the materialized view; and returning a result for the rewritten query.

15. The one or more non-transitory, computer-readable storage media of claim 14, wherein one or more internal tables and a compensation view were created when the materialized view was created, wherein the compensation view comprises one or more operations to compensate the one or more internal tables by obtaining the one or more changes, and wherein, in rewriting the query to generate the query plan, the programming instructions cause the query engine to implement rewriting the query to replace the reference to the materialized view with a reference to the compensation view.

16. The one or more non-transitory, computer-readable storage media of claim 14, wherein the one or more stored procedures include a provenance merge operation to consider the obtained one or more changes.

17. The one or more non-transitory, computer-readable storage media of claim 16, wherein an internal table to provide the materialized view was created in response to a request to create the materialized view and wherein a target of the provenance merge operation is the internal table.

18. The one or more non-transitory, computer-readable storage media of claim 16, wherein the one or more stored procedures further include a delta full query to obtain the one or more changes, wherein the delta full query is a source of the provenance merge operation.

19. The one or more non-transitory, computer-readable storage media of claim 14, wherein the materialized view is directly accessible by a client application.

20. The one or more non-transitory, computer-readable storage media of claim 14, the one or more stored procedures include a delta insert query and a delta delete query to obtain the one or more changes.

* * * * *